United States Patent [19]

Drew et al.

[11] Patent Number: 4,978,222

[45] Date of Patent: Dec. 18, 1990

[54] ANALYSIS OF PERIODIC MOTIONS USING MOIRÉ FRINGES

[75] Inventors: Walter Drew, Higham Ferres; Clive R. Pyne, Sharnbrook, both of England

[73] Assignee: The Secretary of State for Defence, London, United Kingdom

[21] Appl. No.: 358,801

[22] Filed: May 31, 1989

Related U.S. Application Data

[63] Continuation at PCT GB 87/00874 filed Dec. 3, 1987.

[30] Foreign Application Priority Data

Dec. 5, 1986 [GB] United Kingdom ............... 8629160

[51] Int. Cl.$^5$ ..................... G01B 11/16; G01B 11/24
[52] U.S. Cl. ................................................. 356/374
[58] Field of Search ................................. 356/373, 374

[56] References Cited

U.S. PATENT DOCUMENTS 4,459,027 7/1984 Kafri et al. ........................ 356/376

FOREIGN PATENT DOCUMENTS 2520106 7/1983 France .
1276737 6/1972 United Kingdom .

OTHER PUBLICATIONS

"Projection-Imaging Moiré", National Physical Laboratory, MOM h 78, Crown copyright 1987.
"Double Fringe Patterns Measure Vibration", Eureka Transfers Technology, Jul. 1988, pp. 36 and 37.
Optical Engineering, vol. 24, No. 4, Jul./Aug. 1985, (Bellingham, Washington, U.S.A.), D. Post: "Moire Interferometry for Deformation and Strain Studies", pp. 663–667.
Journal of Phycis E; Scientific Instruments, vol. 8, No. 9, Sep. 1975, (Havant, GB), C. A. Miles et al, "Recording the Shape of Animals by a Moiré Method", pp. 773–776.
Applied Optics, vol. 22, No. 6, 15 Mar. 1983, Optical Society of America, (N.Y., U.S.A.), K. G. Hardin et al., "Projection Moiré Interferometer for Vibration Analysis", pp. 856–886.
Soviet Journal of Nondestructive Testing, vol. 20, No. 12, Dec. 1984, Plenum Pub. Corp. (N.Y., U.S.A.), S. T. De et al, "Using the Moiré Pattern of Interference Fringes for Detecting Defects", pp. 772–779.

Primary Examiner—F. L. Evans
Attorney, Agent, or Firm—Nixon & Vanderhye

[57] ABSTRACT

Periodic motions are analyzed by generation of real time moiré fringe images. A line grating mounted on the object (1) surface is photographed using a rigidly supported camera (4) from an oblique angle to the plane of the grating. A negative transparency of the line grating is placed within the camera (4) supported by a glass plate and, with the shutter open, the transparency is first registered with the instant image of the stationary line grating then skewed to produce mismatch fringes. A TV camera (6) monitors the subsequent interaction between the skewed negative and the instant image of the line grating on the moving object (1) as seen on the glass plate at the camera image plane and this interaction is displayed on a TV monitor (10). The image is characterized by the presence of a secondary fringe phenomena indicative of object displacements.

9 Claims, 6 Drawing Sheets

20Hz

70Hz

160Hz

ANALYSIS OF PERIODIC MOTIONS USING MOIRé FRINGES

This application is a continuation of PCT Application PCT/GB87/00874 filed Dec. 3, 1987 which in turn is based upon Great Britain Application No. 8629160 filed Dec. 5, 1986.

This invention relates to a method for monitoring periodic motions in a real time mode by use of moiré fringes. The invention is especially directed to the analysis of non-rigid behaviour in notionally rigid bodies such as dynamically excited aerodynamic models used for the purposes of wind tunnel testing. However, the invention is not limited in application solely to use in connection with aerodynamic models or wind tunnel testing but could find wider usage in structural analysis.

For wind tunnel research into time-dependent aerodynamic phenomena, such as buffetting, it is of great importance for the experimenter to know if the operating conditions are such as to cause non rigid-body motion in the aerodynamic model. There are two requirements: firstly that the experimenter should know when the wind tunnel environment and/or model excitation cause model motions which might damage or destroy the model; and secondly that the experimenter should know which of his flow field measurements will be tainted by unwanted body motion effects. The instrumentation which is incorporated into the aerodynamic model during construction is there for the purpose of measuring flow field phenomena which requires a comprehensive coverage with pressure transducers. The model could be instrumented to detect body motions by means of transducers such as accelerometers but this could only be achieved at the expense of reduced pressure transducer coverage which is obviously undesirable. Furthermore it is not always possible to determine the best positions for mounting the accelerometers without prior knowledge of the expected distortions.

At present there exists methods by which the dynamic characteristics of an aerodynamic model can be predicted to some degree from measurements made prior to the wind tunnel tests. In one method, an accelerometer is stuck upon the model at the wing tip position, and the wing is subjected to controlled impulses acting at predetermined positions. The accelerometer responses and the force impulses are correlated by computer and the results may be displayed visually as dynamic display. Such methods do not take account of the drive chain effects in dynamically excited models and this leads to inaccuracies, nor can they be used to monitor model motions during the course of a wind tunnel test. One known method which can be used in a real time monitoring mode relies on the thermal emissions effects caused by dynamic loadings. However the equipment needed for this method is very expensive and the method is a laborious and slow one for it relies on temperature maps produced by a scanning probe.

The invention as claimed is intended to provide a method for use in the analysis of periodic motions, such as those experienced by dynamically excited aerodynamic models, which can be used in a real time mode, is non-contacting and non-intrusive, and does not rely on expensive equipment.

The claimed invention relies upon the utilisation of moiré fringes in a novel way. Moiré fringes are those interference fringes that may occur when two or more geometric patterns of light and dark are superimposed. Under certain conditions these superimposed patterns may be resolved by the eye as light or dark bands—the moiré fringes, and if the geometric patterns which create the moiré fringes are of a periodic alternating line/space type such as a linear grating then values of grating displacement may be derived from measurement of the consequential fringe movement. The use of moiré fringe methods in the measurement of stress, strain and displacement under constant load is well established. The mathematical basis for these methods and the methods themselves are reviewed in an article by Mr. F. P. Chiang entitled Moiré Methods of Strain Analysis which is published at page 290 of the August 1979 issue of Experimental Mechanics. The prior art usage of moiré methods have largely been confined to constant load applications, however another article of Mr. F. P. Chiang (together with Mr. G. Jaisingh) which is entitled Dynamic Moiré Methods for the Bending of Plates and is published at page 168 of the April 1973 issue of Experimental Mechanics, describes methods by which frozen motion moiré fringe patterns may be obtained from dynamic systems. These methods rely upon off line processing of the received images, by a spatial filtering technique, in order to enhance image quality sufficiently for visual examination. Consequently these techniques would not appear to be adaptable for use in a real time mode.

This invention derives from the discovery that it is possible to create informative moiré fringe images on a real time basis for dynamic systems.

The invention is a method for monitoring periodic motions in a body characterised by:

providing a surface pattern upon by body in a manner such that the surface pattern moves with the body surface in conformity therewith, the surface pattern being an array of straight parallel lines;

providing a reference pattern which is an array of straight parallel lines;

causing the reference pattern and the surface pattern or an image thereof to be superimposed one upon the other at an interaction site on or off the body surface;

with the body at rest firstly adjusting the reference pattern so that at the interaction site it assumes a complementary position and complementary dimensions to the surface pattern then secondly skewing the reference pattern with respect to the surface pattern so that at the interaction site there is created a dense field of mismatch fringes;

and then with the body in motion, displaying in real time the image manifest at the interaction site which image is a composite of the skewed reference pattern and the moving surface pattern, this image exhibiting a secondary fringe phenomena indicative of body displacement.

The method of the invention does not rely on frozen motion images produced by stroboscope or timed flash methods. It works under normal flood lighting and it provides in real time a visual map indicating the degree of peak to peak displacement experienced by the moving body over the whole of the field covered by the surface pattern.

In the case where the interaction site is on the body surface, the reference pattern may be projected onto the surface by optical means but the reference pattern needs to be brought to focus over the whole area of interest. Sensitivity for this case is a function of the angle from which the reference pattern is projected and good sensitivity requires oblique projection if the anticipated body motion is perpendicular to its surface plane. To ensure a good focus is retained the lens plane or the plane of the transparency may be adjusted with respect to the other so that both these planes and the plane of the body surface intersect at a common point to satisfy Scheimpflug's condition.

It is presently preferred to use an interaction site which is not on the body surface. One such version of the invention comprises the following:

arranging a camera to view the surface pattern from an angle at which anticipated movements of the body surface will be manifest at the camera as displacement or distortion of the received image of the surface pattern;

with the body at rest, firstly focussing the camera, then secondly photographing the surface pattern to provide a reference image then thirdly interacting the reference image with the instant surface pattern image received at the camera image plane with the camera shutter open, to provide a superimposed composite, then fourthly creating a field of moiré mismatch fringes in the composite by first registering the reference image with the instant surface pattern image then skewing the reference image;

then with the body in motion, providing a continuous real time visual display of the interference field in the superimposed composite of the instant surface pattern image and the skewed reference image.

In the aforementioned preferred version of the invention a plate camera may be utilised in an open shutter configuration, the reference image being produced as a transparency and placed within the camera at its focal plane. A glass backing plate can be used to support the transparency.

Preferably the transparency is a negative image so that the surface image and the reference image are brought to register in a nulled condition which is easy to discern. It is believed that the reference image could be stored as a video disk or tape record. For such an arrangement the superimposed composite could be produced by video mixing.

The sensitivity and resolution of the method are dependent upon the camera viewing angle. The camera should be so positioned, having regard to the anticipated motion of the body, that the body motion causes significant movement of the surface pattern manifest at the camera position. For a body motion substantially perpendicular to the body surface a camera viewing angle, defined as the angle between the central axis of the camera and the plane of the body surface (ignoring surface curvature), and within the range 45 to 60 degrees is preferred as an acceptable compromise between sensitivity and practical problems.

It is important for the successful use of this method that the photograph which is used as the reference image is of good quality. The photograph should be free from bright spots and precisely focussed at least over the whole of the body surface area which is of interest. To secure the good focus the lens plane or the image plane of the camera may be adjusted with respect to the other so that both these planes and the plane of the body surface intersect at a common point to satisfy Scheimpflug's condition.

It is preferred that the surface pattern be arranged such that its lines run parallel to the axis about which it is intended to resolve the monitored motion. The camera should be set so as to be at right angles to the pattern lines or as close as possible to this.

It is preferred to monitor the superimposed composite interference field indirectly using a closed circuit television system with the television camera being set to receive the composite image produced at the back of the still camera.

The preferred surface pattern is a linear grating having 0.3 mm pitch and unitary mark/space ratio. An uneven mark: space configuration can be used although a grossly uneven configuration will degrade the quality of the image. It is suggested that the mark: space ratio should not exceed 5:1 for reasonable results.

It is presently preferred to provide the surface pattern for the body by means of a surface marking rather than projection. It would seem difficult for a projection based system to avoid distortion of the surface pattern upon motion of the body when the motion is to be observed from a non perpendicular position. The surface marking may be produced as an overlay by photographic reproduction of a glass diffraction grating.

The invention is now described by reference to the drawings of which:

Figure 1:
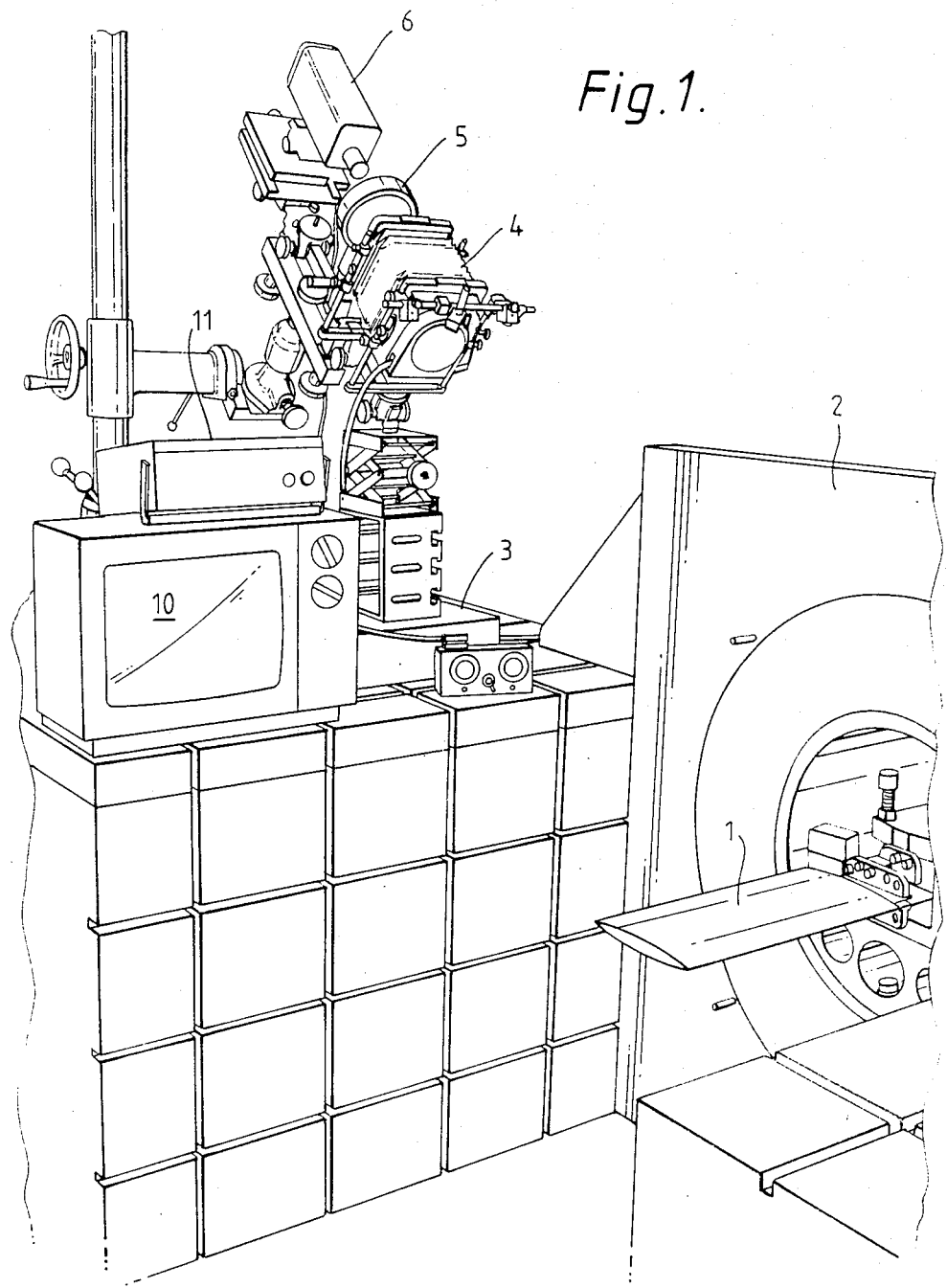
FIG. 1 is a general perspective view of the process apapratus.
Figure 2:
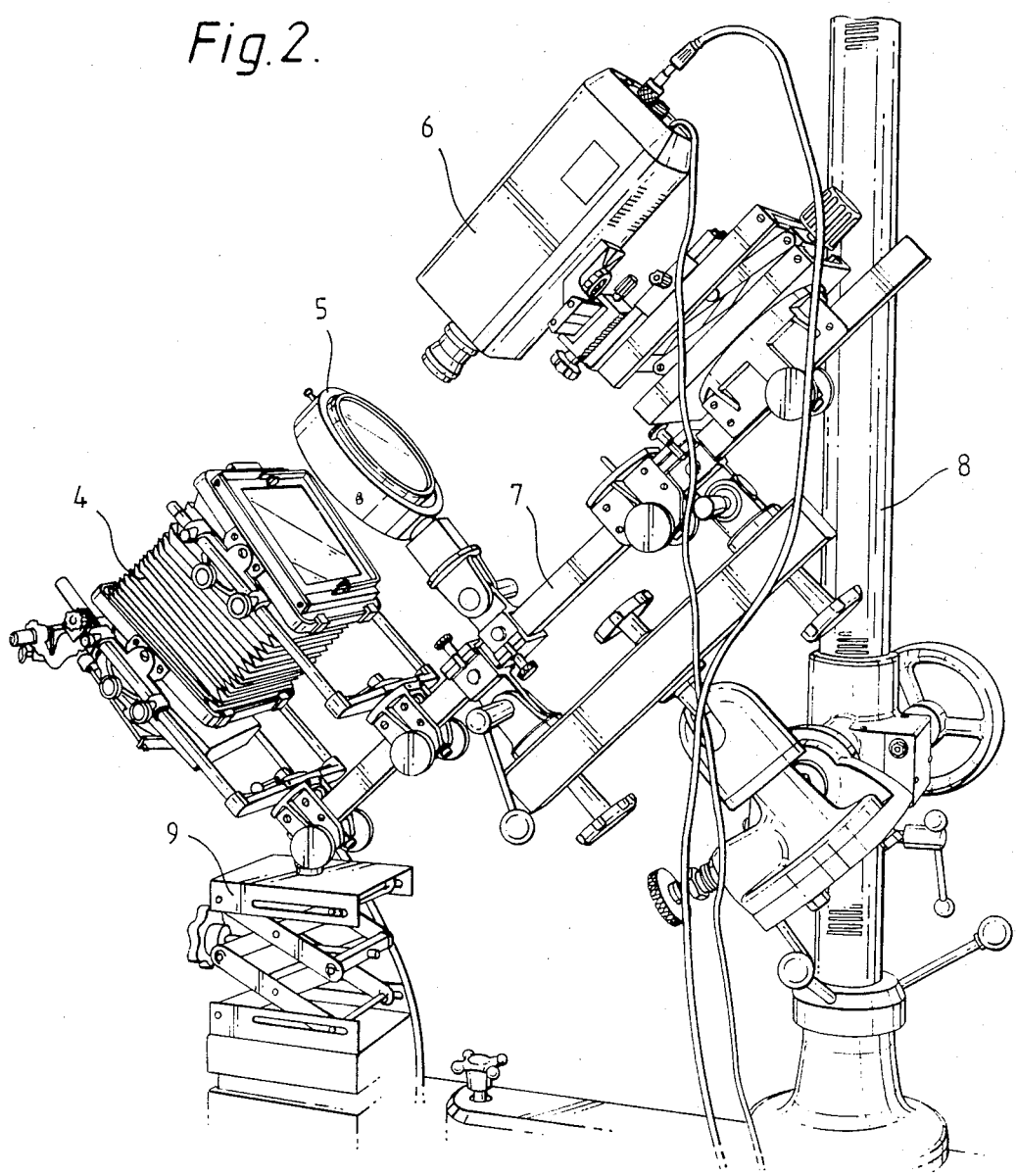
FIG. 2 is a more detailed perspective view of the same.

In FIGS. 1 and 2 a laboratory use of the invention is depicted. A notionally rigid rectangular platform wing model 1 is mounted at 50% root chord to a pitch drive mechanism (not seen in the illustration) located within a mock up of a wind tunnel wall depicted at 2. Overlooking the wing model 1 there is an array of optical equipment which is seen in more detail in FIG. 2. This optical equipment is rigidly mounted upon a heavy bench 3 for the avoidance of vibration. The optical equipment shown in FIGS. 1 and 2 comprises a plate camera 4, a condenser lens 5, and a standard 625 line television camera 6. This optical equipment is mounted upon a monorail 7 permitting axial adjustments of the individual items and the monorail 7 is supported on a robust stand 8 which allows the monorail 7 to be adjusted in elevation, in azimuth and in pitch. At its lower end the monorail 7 is given additional support by means of a jacking platform 9. The television camera 6 is connected to a closed circuit monitor 10 and a video recorder 11.

To set up the equipment for use it is necessary to provide two gratings in order to create a moiré interference pattern. One grating, called herein the surface pattern, is mounted upon the wing model 1 such that it moves with the wing model 1. The surface pattern should not provide any stiffening of the wing model 1. The other grating, called herein the reference pattern, is maintained in a fixed position independent of the model movement. The specimen grating is prepared by taking contact prints of a glass reference linear grating of 0.3 mm pitch and equal mark: space dimensions.

The prints are tailored to provide complete coverage of the upper surface of the wing model 1 and stuck in place thereon with adhesive. The prints are arranged so that the grating lines run along the span of the wing model 1 in parallel with the pitching drive axis, and the optical equipment upon the monorail 7 is set at a right angle to this drive axis—as shown in FIG. 1.

This configuration is suitable for analysis of movements about the pitching drive axis. Should it be desired to analyse wing bending movement along the span of the wing, then the lines of the surface pattern are arrayed across the chord of the wing and the optical equipment upon the monorail 7 is aligned with the span of the wing again at a right angle to the lines of the surface pattern. At this stage a ground glass screen is placed at the image plane of the plate camera 4 and the optical equipment upon the monorail 7 is directed towards the wing model from a suitable viewing angle (angle of elevation). Measurement resolution is dependent, inter alia, upon choice of viewing angle and angles of 45-60 degrees have been used. With the equipment adjusted to the desired viewing angle, and with the surface pattern in view upon the ground glass screen, the image plane of the camera 4 is adjusted in separation and tilt relative to the lens plane to secure a precise focus over the whole of the image using full lens aperture. The grating density produced on the camera screen is of the order of 40 lines per mm and a microscope eye piece is used as an aid to focussing. Once the whole image is brought into precise focus, the ground glass screen is replaced by a plate holder preloaded with film for exposure to form a reference pattern. Production of this master photograph requires carefully controlled lighting conditions to give even illumination of the model surface without bright spots or shadows. For this purpose black-out curtains and quartz iodine studio lighting is used and the surface illumination is checked against a spot photometer. After processing, the resulting negative is repositioned in the camera's focal plane such that the real image of the surface pattern and the negative reference image are in exact registration with the two images nulled and no interference fringes observable. The negative is then rotated minutely so as to form a series of mismatch fringes visible as a series of broad alternating bands of light and dark running at right angles to the lines on the specimen grating. This initial mismatch is crucial to the success of the process for it provides a good definition of conventional moiré fringes (which are called herein primary fringes) without which the method is of little use in a dynamic real time mode for such image enhancement as might improve the results can only be performed off-line.

Once the apparatus has been prepared and set up as described, the wing model 1 may be subjected to pitch excitation at varying frequencies an the interaction between the surface pattern (illuminated under floodlighting) and the reference pattern is observable at the back of the plate camera 4. This interaction is captured by the television camera 6, displayed upon the monitor 10 and recorded on video recorder 11. The condenser lens 5 is used to enhance the intensity and contrast of the image for video recording.

Figure 3A:
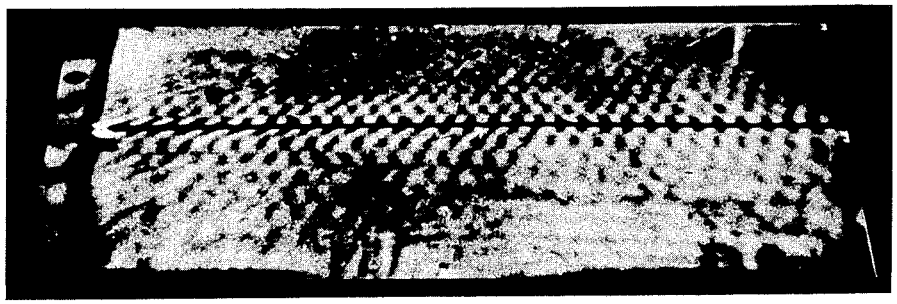
FIGS. 3A, 3B and 3C are moiré fringe images produced by a pitch-excited model when driven at different frequencies.
Figure 3B:
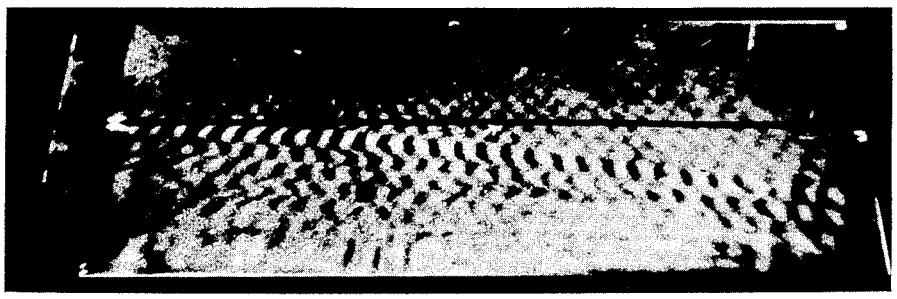
Figure 3C:
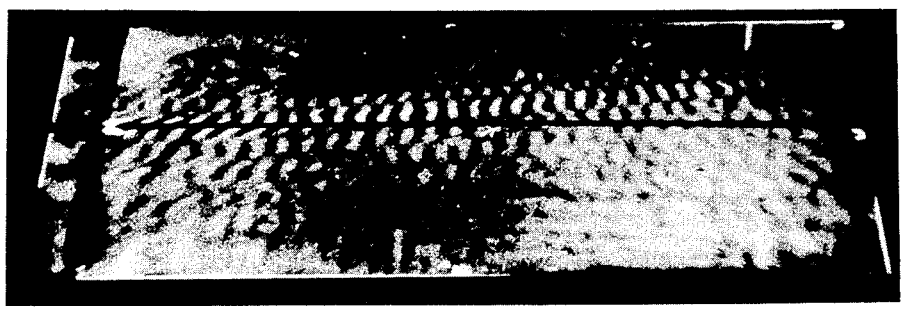
Figure 4A:
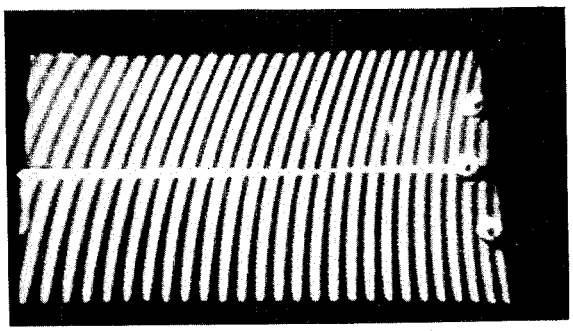
FIGS. 4A, 4B, 4C and 4D are moiré fringe images produced by a pitch-excited flat plate model.
Figure 4B:
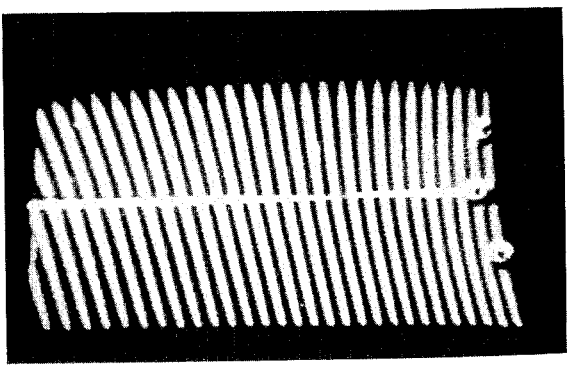
Figure 4C:
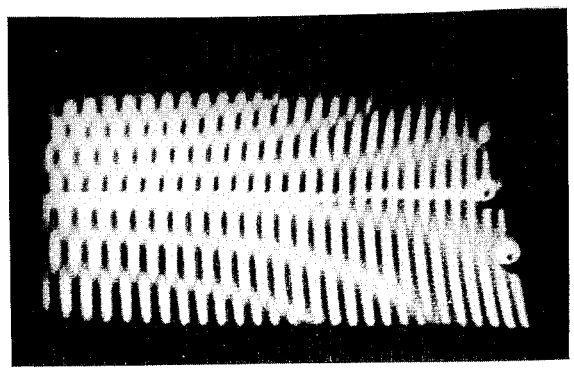
Figure 4D:
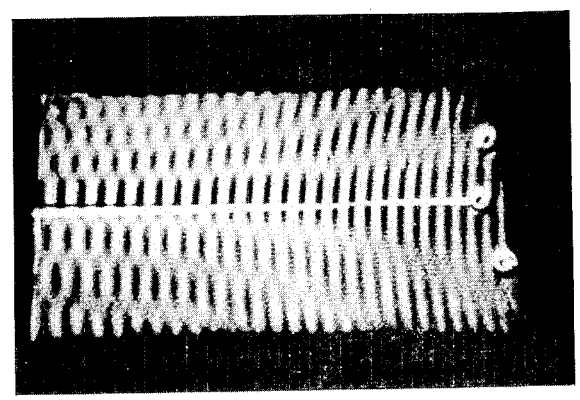

FIG. 3 depicts still pictures taken from the monitor screen of real time images produced when the wing model 1 is a notionally rigid aerofoil section driven in pitch at varying frequencies in the absence of windage. The viewing angle is 45 degrees. FIG. 3A shows the results at a 20 Hz drive frequency, FIG. 3B the results at 70 Hz and FIG. 3C the results at 160 Hz. The wing shown in these Figures is mounted at 50 percent root chord at the left hand side as seen. In each of these pictures there is a near centre region where there is a clearly defined band of primary fringes, the band (though not the fringes) running across the picture from side to side. This band delimits the area where the pitching motion is insufficient to destroy the primary moiré fringes and by implication this band coincides with the pitching axis of the wing. It will be seen that at 20 Hz this band follows the centre line of the wing along the span indicating that there is little drive axis distortion at this frequency. In the 70 Hz illustration the band of primary fringes originates as expected from the centre of the wing at the left hand side, where it is constrained by the drive means, but progressively deviates from the centre line towards one edge of the wing (the trailing edge) along the span of the wing towards the wingtip. In the 160 Hz illustration a similar manifestation is apparent but the deviation is towards the leading edge. These images demonstrate the degree and phase of pitching axis distortions experienced by this wing in the absence of windage, consequent upon wing inertia. The presence of windage may have similar manifestations. This axis distortion has been confirmed by accelerometer data. It might be expected that apart from the clearly defined area of primary fringes which identifies the pitching axis node line, the remainder of the field would be characterised by blurred fringes indicative of primary fringe motion consequent upon the body motion. In practice as this Figure illustrates there are other lateral bands of fringes outside the primary fringe region. These subsidiary bands of fringes are called herein secondary fringes. They are useful as indicators of areas where pitching displacements are uniform and as such these secondary fringes yield useful information regarding the motion of the wing. The nature and origin of these secondary fringes is better appreciated by reference to FIG. 4.

FIG. 4 depicts still pictures taken from the monitor screen when the apparatus is set up using a viewing angle of 60 degrees to analyse the motion of a flat plate driven in pitch at 30 Hz in the absence of windage. In this Figure and in susbsequent Figures the plate is driven at 50 percent chord from the right hand as seen. FIGS. 4A, 4B and 4C were obtained using stroboscopic lighting in place of floodlighting. FIG. 4A shows the primary fringe pattern observable when the pitching motion is froze at one extreme. FIG. 4B shows the pattern when the motion is frozen at the opposite extreme. FIG. 4C is one produced photographically in the darkroom by superimposing the images shown at 4A and 4B. FIGS. 4A–4C do not depict the results of the process of the invention they are included herein solely for the purpose of explanation. FIG. 4D shows an image obtained from the monitor screen when the plate is illuminated by floodlighting using the real time process of the invention. It will be seen that there is considerable similarity between the patterns observable in FIGS. 4C and 4D. In each of these images there is a central region where the original primary fringes remain, outer bands where new secondary fringes are apparent, and lateral bands delimiting the various zones of secondary fringe patterns. It is not completely understood why this primary/secondary fringe configuration can be observed in real time but it would appear to be to some extent dependent upon the frequency of drive and persistence of vision. It is not solely attributable to features of the closed circuit television system because it is observable at the back of the plate camera 4—upstream of the television system. Whatever its origin, the secondary fringe manifestation yields useful information regarding the displacement field existing over the periodically excited pitch driven model. Each secondary fringe delineates an area of the body where the body movement is such as to cause a particular level of interference and consequently the secondary fringes may be interpreted as contours defining the degree of displacement manifest at all points on the object. The interference pattern shown in FIG. 4D indicates that there is a large central region which tapers towards the free end (the left side) which is subject only to the drive motion and that outside this region, predominantly at the free end, there are regions subject to flapping motion which causes displacements several times greater than that resulting from the drive motion.

Figure 5A:
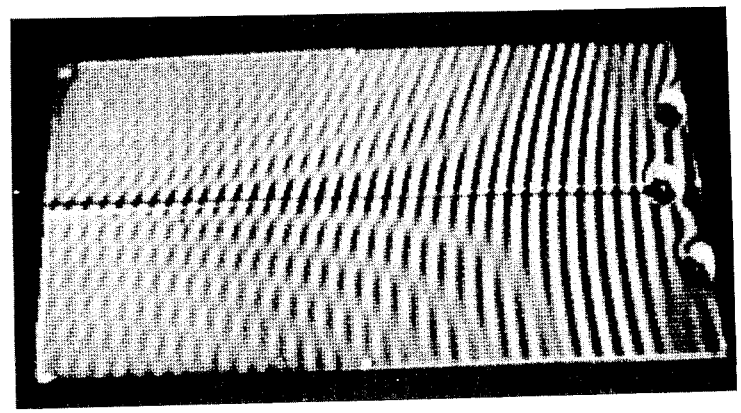
FIGS. 5A and 5B illustrate the interpretation of a moiré fringe image.
Figure 5B:
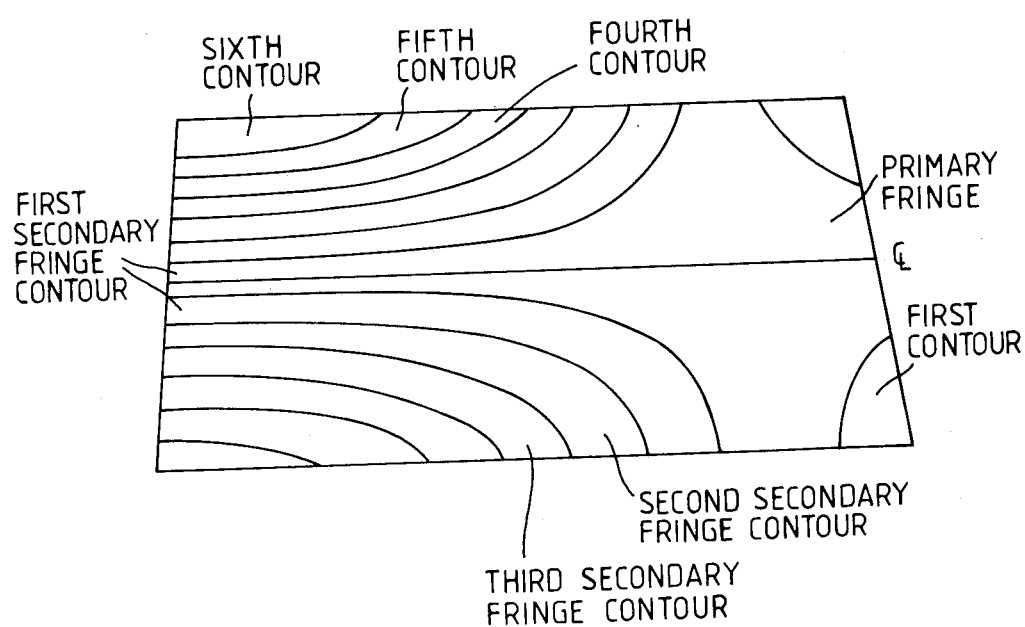

FIG. 5A shows an interference pattern produced when driving the aforementioned flat plate model such that it resonates in the fundamental torsional mode. FIG. 5B is a line drawing of the same interference pattern captioned for ease of understanding. It has been deduced that the displacement (on a peak to peak basis) for a flat specimen grid system as illustrated in FIG. 5 can be deduced from the interference pattern by relating it to camera viewing angle and the pitch of the specimen grating. For such a system the displacement at any point on the plot is given by the expression $$Nc \times P/\cos\alpha$$

where P is the pitch of the specimen grating, $\alpha$ is the viewing angle, and Nc is the contour level at the point. So for the system illustrated the secondary fringes can be interpreted as contours defining 0.6 mm displacement bands.

Given good secondary fringe definition, measurements of displacement can be easily made. Accuracy depends to some extent on model thickness and surface curvature effects, optical imperfrections etc. However these effects may be offset to some extent, by virtue of the limited system resolution. The eye cannot resolve densely grouped fringes, and visual saturation is quickly reached, hence there must always be a trade-off between resolution and maximum usable amplitude. The system resolution 'r', is given by:

$$r = P/\cos\alpha$$

If we say that the maximum number of secondary fringes that can be resolved on a TV screen, is given by 'Fd', then the mawximum allowable amplitude 'Xmax', is given by;

$$X\ max = Fd.P/\cos\alpha$$

The gratings used in the current work were of 0.3 mm pitch, with a camera angle of 60 degrees, resulting in a resolution of 0.6 mm. Although adequate for the measurements described, this figure may be improved by reducing the grating pitch or the viewing angle. However, both of these parameters are constrained by practical limitations, such as photographic resolution, viewing difficulties associated with model curvature etc.

Figure 6A:
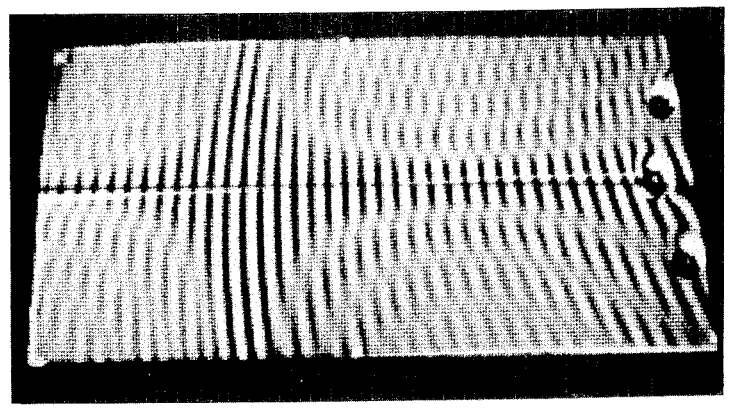
FIGS. 6A, 6B and 6C are moiré fringe images reflecting several body vibration modes.
Figure 6B:
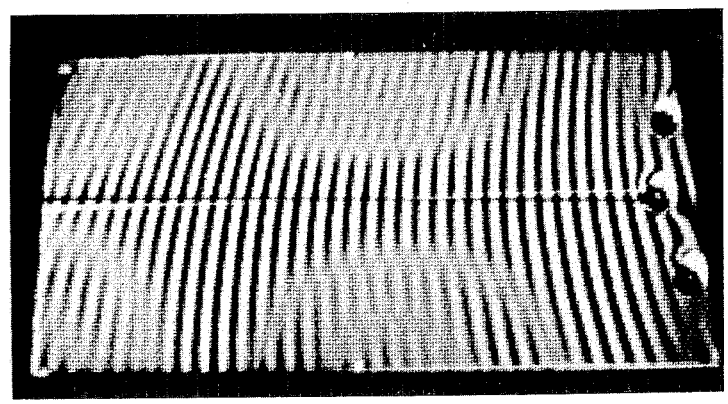
Figure 6C:
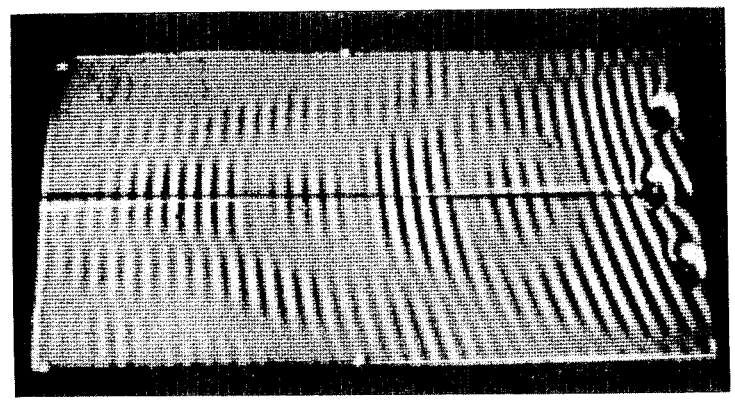

FIGS. 6A, 6B and 6C show interference patterns obtained when the flat plate system previously mentioned is driven at various resonant modes. FIG. 6A is the second harmonic torsional mode. FIG. 6B is the third harmonic torsional mode. FIG. 6C is the third harmonic bending mode with torsional impurity.

We claim:

1. A method for monitoring periodic motions in a body comprising:
   providing a surface pattern upon the body in a manner such that the surface pattern moves with the body surface in conformity therewith, the surface pattern being an array of straight parallel lines;
   providing a reference pattern which is an array of straight parallel lines;
   causing the reference pattern and the surface pattern or an image thereof to be superimposed one upon the other at an interaction site on or off the body surface;
   with the body at rest firstly adjusting the reference pattern so that at the interaction site it assumes a complementary position and complementary dimensions to the surface pattern then secondly skewing the reference pattern with respect to the surface pattern so that at the interaction site there is created a dense field of the mismatch fringes, characterised by providing a continuous real-time visual display of an image manifest at the interaction site with the body in motion, which image is a composite of the skewed reference pattern and the moving surface pattern, this image exhibiting a secondary fringe phenomena indicative of body displacement.

2. A method as claimed in claim 1 comprising:
   providing a surface pattern upon the body in a manner such that the surface pattern moves with the body surface in conformity therewith, the surface pattern being an array of straight parallel lines;
   arranging a camera to view the surface pattern from an angle at which anticipated movements of the body surface will be manifest at the camera as displacement or distortion of the received image of the surface pattern;
   with the body at rest, firstly focussing the camera, then secondly photographing the surface pattern to provide a reference image then thirdly interacting the reference image with the instant surface pattern image received at the camera with the instant surface pattern image received at the camera image plane with the camera shutter open, to provide a superimposed composite, then fourthly creating a field of moiré mismatch fringes in the composite by first registering the reference image with the instant surface pattern image then skewing the reference image characterised by;
   providing a continuous real time visual display of the interference field in the superimposed composite of the instant surface pattern image and the skewed reference image with the body in motion.

3. A method as claimed in claim 2 in which the reference image is utilised in the form of a photographic transparency and in which the superimposed composite is created by placing the transparency at the image plane of the camera, keeping the camera shutter open so as to superimpose upon the transparency the instant image, and in which the superimposed composite is monitored through the back of the camera.

4. A method as claimed in claim 3 in which the photographic transparency is a negative image.

5. A method as claimed in claim 1 in which the camera is set at a viewing angle of 45 to 60 degrees with respect to anticipated direction of motion of the body surface.

6. A method as claimed in claim 1 in which the visual display is provided on a television monitor.

7. A method as claimed in claim 2 in which the reference image is stored as a video recording.

8. A method as claimed in claim 7 in which the superimposed composite is produced in real time by the video mixing.

9. A method as claimed in claim 1 in which the surface pattern is configured with a mark: space ratio not exceeding 5:1.

* * * * *